(12) United States Patent
Tayag et al.

(10) Patent No.: US 6,597,458 B2
(45) Date of Patent: Jul. 22, 2003

(54) METHOD AND SYSTEM FOR STABILIZING AND DEMODULATING AN INTERFEROMETER AT QUADRATURE

(75) Inventors: Tristan J. Tayag, Ft. Worth, TX (US); Christopher A. Belk, Ft. Worth, TX (US)

(73) Assignee: Texas Christian University, Ft. Worth, TX (US)

( * ) Notice: Subject to any disclaimer, the term of this patent is extended or adjusted under 35 U.S.C. 154(b) by 176 days.

(21) Appl. No.: 09/775,945

(22) Filed: Feb. 2, 2001

(65) Prior Publication Data

US 2002/0131048 A1 Sep. 19, 2002

(51) Int. Cl.$^7$ .................................................. G01B 9/02

(52) U.S. Cl. ....................... 356/477; 356/482; 356/496; 385/12; 250/227.19

(58) Field of Search ................................ 356/477, 482, 356/496, 497; 385/12; 250/227.19, 227.27

(56) References Cited

U.S. PATENT DOCUMENTS

| | | | |
|---|---|---|---|
| 5,166,749 A | 11/1992 | Curbelo et al. | 356/346 |
| 5,321,501 A | 6/1994 | Swanson et al. | 356/345 |
| 5,459,570 A | 10/1995 | Swanson et al. | 356/345 |
| 5,479,257 A | * 12/1995 | Hashimoto | 356/457 |
| 5,798,834 A | * 8/1998 | Brooker | 250/227.27 |
| 5,896,560 A | 4/1999 | Pfiefer et al. | 455/35.1 |
| 5,903,350 A | 5/1999 | Bush et al. | 356/345 |
| 5,956,355 A | 9/1999 | Swanson et al. | 372/20 |
| 6,025,913 A | 2/2000 | Curbelo | 356/346 |
| 6,128,080 A | 10/2000 | Janik et al. | 356/351 |
| 6,388,739 B1 | * 5/2002 | Rice | 356/28.5 |

FOREIGN PATENT DOCUMENTS

WO WO 98/35203 8/1998 ............ G01B/9/02

OTHER PUBLICATIONS

*Optical Fiber Sensor Technology,* Grattan et al., pp 207–215 No date.
*Interferometric Demodulator,* OPD–200, A Digital Process, pp 1–2.
*Digital Demodulation of a Fractional Fringe Interferometer,* Belk et al., TCU, pp 1–8.

(List continued on next page.)

*Primary Examiner*—Robert H. Kim
*Assistant Examiner*—Elizabeth Gemmell
(74) *Attorney, Agent, or Firm*—Brian F. Russell; Charles D. Gunter, Jr.

(57) ABSTRACT

A method and system for stabilizing and demodulating an interferometer at quadrature are described. In response to receipt of a signal indicative of optical power of the interferometer, an interferometer control system determines an optical path length correction required to stabilize the interferometer at quadrature utilizing signal amplitudes appearing at multiple harmonics of the signal. In a particularly preferred embodiment, the signal amplitudes are calculated utilizing the Goertzel algorithm, a computationally efficient discrete Fourier transform. The interferometer control system then outputs an error signal indicative of the optical path length correction. In a preferred embodiment, the error signal forms the DC component of a composite stabilization signal, whose AC component is the reference modulation signal utilized to excite a transducer to modulate the optical path length of the interferometer. With the interferometer stabilized at quadrature, the interferometer control system determines a first signal amplitude of a particular harmonic without target oscillation and a second signal amplitude of the same harmonic with target oscillation. Based upon the relative magnitudes of the first and second signal amplitudes, the interferometer control system determines a solution set for the displacement amplitude of the interferometer target. Any ambiguity in the displacement amplitude can then be eliminated utilizing additional information gained from the signal amplitude present at a harmonic of a target oscillation frequency.

30 Claims, 6 Drawing Sheets

OTHER PUBLICATIONS

*The Application of Digital Signal Processing to Stabilize an Interferometer at Quadrature,* Tayag et al., TCU, pp 75–78.

*The Digital Stabilization and Demodulation of a Fractional Fringe Interferometer,* Belk, TCU, May 10, 2000.

1. Passive Homodyne Papers: T. J. Tayag, "Quantum–noise-limited sensitivity of an interferometer using a phase generated carrier demodulation scheme," *Opt. Eng. Lett.,* hardcopy to appear in Feb. 2002, electronic version: http://spie.org/app/Publications/index.cfm?fuseaction=letters&type–oe (Nov. 2001).

M. Song, S. Yin, and P. B. Ruffin, "Fiber Bragg grating strain sensor demodulation with quadrature sampling of a Mach–Zehnder interferometer," *Appl. Opt.,* vol. 39, No. 7, pp. 1106–1111 (Mar. 2000).

M. D. Todd, G. A. Johnson, and C. C. Chang, "Passive, light intensity–independent interferometric method for fibre Bragg grating interrogation," *Electron. Lett.,* vol. 35, No. 22, pp. 1970–1971 (Oct. 1999).

Y. Lo, "In–fiber Bragg grating sensors using interferometric interrogations for passive quadrature signal processing," *IEEE Photonics Technol. Lett.,* vol. 10, No. 7, pp. 1003–1005 (Jul. 1998).

P. G. Davis, I. J. Bush, and G. S. Maurer, "Fiber opitc displacement sensor," Reprint: *Fourth Pacific Northwest Fiber Optic Sensor Workshop,* SPIE vol. 3489, pp. 18–22 (Sep. 1998).

A. Cekorich, J. Bush, and C. Kirkendall, "Multi–channel interferometric demodulator," Reprint *Third Pacific Northwest Fiber Optic Sensor Workshop,* SPIE vol. 3180, pp. 1–11 (May 1997).

A. Cekorich and J. Bush, "Open loop digital demodulator for interferometric sensors," http://www.optiphase.com/tech library.htm, accessed Sep. 20, 2001.

J. Bush, C. A. Davis, F. McNair, A. Cekorich, and J. Bostick, "Low cost fiber optic interferometric sensors," Reprint: *Second Pacific Northwest Fiber Optic Sensor Workshop,* SPIE vol. 2872, pp. 1–12 (May 1996).

K. P. Koo and A. D. Kersey, "An optical phase amplification technique for interrogating fiber resonator sensors," *IEEE Photonics Technol. Lett.,* vol. 7, No. 2, pp. 209–211 (Feb. 1995).

A. B. Tveten, A. M. Yurek, M. N. Opsasnick, and A. Dandridge, "Demodulator optimization for the interrogation of fibre optic hydrophones in real world environments," $10^{th}$ *Optical Fibre Sensors Conference,* pp. 522–525, Glasgow, UK (1994).

A. Dandrige, A. B. Tveten, and T. G. Giallorenzi, "Homodyne demodulation scheme for fiber optic sensors using phase generated carrier," *IEEE J. Quantum Electron.,* vol. QE–18, No. 10, pp. 1647–1653 (Oct. 1992).

W. Jin, D. Walsh, D. Uttamchandani, and B. Culshaw, "A digital technique for passive demodulation in a fiber optic homodyne interferometer," $1^{st}$ *European Conf. On Smart Structures and Materials,* pp. 57–60, Glasgow, UK (1992).

A. D. Kersey, D. A. Jackson, and M. Corke, "Demodulation scheme fibre interferometric sensors employing laser frequency switching," *Electron. Lett.,* vol. 19, No. 3, pp. 103–104 (Feb. 1983).

K. P. Koo, A. B. Tveten, and A. Dandridge, "Passive stabilization scheme for fiber interferometers using (3×3) fiber directional couplers," *Appl. Phys. Lett.,* vol. 41, No. 7, pp. 616–618 (Oct. 1982).

I. J. Bush, "Wavelength switched passive interferometric sensor system," U.S. patent No. 4,789,240 (issued Dec. 6, 1988).

E. Kiesel, "Signal evaluation method for a fiber–optic rotation sensor," U.S. patent No. 4,756,620 (issued Jul. 12, 1988).

2. Active Homodyne Papers: A.D. Kersey, M.J. Marrone, K.P. Koo, and A. Dandridge, "Optically demodulated interferometric sensor system," $10^{th}$ *Optical Fibre Sensors Conference,* pp. 343–346, Glasgow, UK (1994).

3. Heterodyne Papers: P. A. S. Jorge, L. A. Ferreira, and J. L. Santos, "Analysis of the flyback effects on the serrodyne interferometric demodulaiton of fiber optic Bragg grating sensors," *Opt. Eng.,* vol. 39, No. 5, pp. 1399–1404 (May 2000).

W. J. Lee, B. K. Kim, K. H. Han, and B. Y. Kim, "Dual heterodyne polarization diversity demodulation for fiber–optic interferometers," *IEEE Photonics Technol. Lett.,* vol. 11, No. 9, pp. 1156–1158 (Sep. 1999).

J.X. Fang and H. F. Taylor, "Accurate monitoring of an interferometric fiber–optic sensor with a multimode semiconductor laser," *Opt. Lett.,* vol. 24, No. 8, pp. 522–524 (Apr. 1999).

A. Link and H, von Martens, "Amplitude and phase measurement of sinusoidal vibration in the nanometer range using laser interferometry," *Measurement,* vol. 24, pp. 55–67 (1998).

B. Y. Kim, "Grated fiber optic rotation sensor with linearized scale factor," U.S. patent No. 4,707,136 (issued Nov. 17, 1987).

W. Auch, H. Graf, and E. Schlemper, "Rotation rate measuring instrument," U.S. patent No. 4,704,032 (issued Nov. 3, 1987).

H. C. Lefevre, "Fiber optic rotation sensor with extended dynamic range," U.S. patent No. 4,687,330 (issued Aug. 18, 1987).

B. Y. Kim, "Fiber optical rotation sensor with extended dynamic range," U.S. patent No. 4,637,722 (issued Jan. 20, 1987).

4. Pseudoheterodyne Papers: D.A. Jackson, A. D. Kersey, M. Corke, and J. D. C. Jones, "Pseudoheterodyne detection scheme for optical interferometers," *Electron. Lett.,* vol. 18, No. 25, pp. 1081–1083 (Dec. 1982).

5. Synthetic–Heterodyne Papers: J. H. Cole, B. A. Danver, and J. A. Bucaro, "Synthetic–heterodyne interometic demodulation," *IEEE J. Quantum Electron.,* vol. QE–18, No. 4, pp. 694–697 (Apr. 1982).

6. Fiber–Bragg Grating Papers: C.C. Chan, J. M. Gong, W. Jin, and M. S. Demokan, "Investigation of unwanted interferometric signals in a fiber Bragg grating sensor using a tunable laser and a first derivative interrogation technique," *Opt. Comm.,* vol. 173, pp. 203–210 (Jan. 2000).

A. Arie and M. Tur, "Static fiber–Bragg grating strain sensing using frequency–locked lasers," *J. Lightwave Technol.,* vol. 17, No. 10, pp. 1849–1855 (Oct. 1999).

L. A. Ferreira, E. V. Diatzikis, J. L. Santos, and F. Farahi, "Demodulation of fiber Bragg gratin sensors based on dynamic tuning of a mulitmode laser diode," *Appl. Opt.,* vol. 38, No. 22, pp. 4751–4759 (Aug. 1999).

C. R. Giles, T. Strasser, K. Dryer, and C. Doerr, "Concatenated fiber grating optical monitor," *IEEE Photonics Technol. Lett.,* vol. 10, No. 10, pp. 1452–1454 (Oct. 1998).

L. A. Ferreira, E. V. Diatzikis, J. L. Santos, and F. Farahi, "Frequency–modulated multimode laser diode for fiber Bragg grating sensors," *J. Lightwave Technol.,* vol. 16, No. 9, pp. 1620–1630 (Sep. 1998).

S. H. Yun, D. J. Richardson, and B. Y. Kim, "Interrogation of fiber grating sensor arrays with a wavelength–swept fiber laser," *Opt. Lett.,* vol. 23, No. 11, pp. 843–845 (Jun. 1998).

7. Others Papers: M. Schmidt, B. Werther, N. Furstenau, M. Matthias, and T. Melz, "Fiber–optic extrinsic Fabry–Perot interferometer strain sensor with < 50 pm displacement resolution using three–wavelength digital phase demodulation," *Opt. Express,* vol. 8, No. 8, pp. 475–480 (Apr. 2001).

A. D. Kersey, "Interrogation and multiplexing techniques for fiber Bragg grating strain–sensors," SPIE vol. 2071, pp. 30–48 (Apr. 1993).

A. D. Kersey, "Multiplexed fiber optic sensors," *Distributed and Multiplexed Fiber Optic Sensors II,* SPIE vol. 1797, pp. 161–185 (1992).

\* cited by examiner-

METHOD AND SYSTEM FOR STABILIZING AND DEMODULATING AN INTERFEROMETER AT QUADRATURE

BACKGROUND OF THE INVENTION

1. Technical Field

The present invention relates in general to interferometry and, in particular, to the stabilization and demodulation of an interferometer at quadrature.

2. Description of the Related Art

An interferometer can be utilized to measure the small displacement amplitude of a vibrating target based upon the pattern formed by interfering two beams of light. Interferometry finds use, for example, in acoustic sensing, transducer calibration and microelectromechanical systems (MEMS) characterization.

FIG. 1 illustrates a conventional fiber-optic interferometer in the Michelson configuration. As shown, laser light emitted from a He—Ne laser 10 is split into a signal arm beam 12 and a reference arm beam 14 by a fiber-optic coupler 16. Fiber-optic coupler 16 transmits reference arm beam 14 via fiber to a reference mirror 20, which reflects reference arm beam 14 back to fiber-optic coupler 16. Signal arm beam 12 is similarly transmitted via fiber to a target 24, which reflects signal arm beam 12 back to fiber-optic coupler 16. Reference mirror 20 is driven by a piezoelectric transducer (PZT) 22 to produce a sinusoidal variation in the optical path length of the reference arm having a known amplitude and frequency. Target 24 similarly vibrates sinusoidally at a known frequency and unknown amplitude.

Fiber-optic coupler 16 combines signal and reference arm beams 12 and 14 to form a combined beam 26 that exhibits an interference pattern. To maximize fringe contrast in the interference pattern, a polarization controller 18 may be employed in one of the reference or signal arms to match the polarization of reference and signal arm beams 12 and 14. Combined beam 26 is then transmitted to a photodetector 28, which produces an electrical signal indicative of the incident optical power. The optical power ($P_O$), which varies as the optical path length difference between the reference and signal arms, has the form $$P_O Re\{E_{ro}E_{to}^*\}\cos(\Phi+2k\delta), \quad (1)$$

where
- $E_{ro}$=complex electric field amplitude of the reference arm beam,
- $E_{to}^*$=complex conjugate of electric field amplitude of the signal arm beam,
- $\Phi$=static optical path length difference between reference and signal arms;
- k=propagation constant of light, and
- $\delta$=target displacement.

In practical systems, the reference and signal arms typically have unequal contributions to the total optical power incident upon photodetector 28. In such cases, the maximum measurement sensitivity (i.e., the greatest change in optical power for an incremental change in target amplitude) occurs when $\Phi$, the optical path length difference between the reference and signal arms, is equal to $(\pi/2)\pm\pi n$, where n is an integer. This condition, which is known as quadrature, is difficult to maintain in practice because vibrations and temperature and humidity-induced variations in k, the propagation constant, cause $\Phi$ to drift from quadrature over time.

Accordingly, the present invention recognizes that it would be useful and desirable to provide a method and system for stabilizing an interferometer at quadrature.

SUMMARY OF THE INVENTION

The present invention provides an improved method and system for stabilizing and demodulating an interferometer at quadrature.

According to a preferred embodiment of the present invention, an interferometer control system receives from an interferometer a signal indicative of optical power of the interferometer. In response to receipt of the signal, the interferometer control system determines an optical path length correction required to stabilize the interferometer at quadrature utilizing signal amplitudes appearing at multiple harmonics of the signal. In a particularly preferred embodiment, the signal amplitudes are calculated utilizing the Goertzel algorithm, a computationally efficient discrete Fourier transform. The interferometer control system then outputs an error signal indicative of the optical path length correction. In a preferred embodiment, the error signal forms the DC component of a composite stabilization signal, whose AC component is the reference modulation signal utilized to excite a transducer to modulate the optical path length of the interferometer. With the interferometer stabilized at quadrature, the interferometer control system determines a first signal amplitude of a particular harmonic without target oscillation and a second signal amplitude of the same harmonic with target oscillation. Based upon the relative magnitudes of the first and second signal amplitudes, the interferometer control system determines a solution set for the displacement amplitude of the interferometer target. Any ambiguity in the displacement amplitude can then be eliminated utilizing additional information gained from the signal amplitude present at a harmonic of a target oscillation frequency.

Additional objects, features, and advantages of the present invention will become apparent from the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
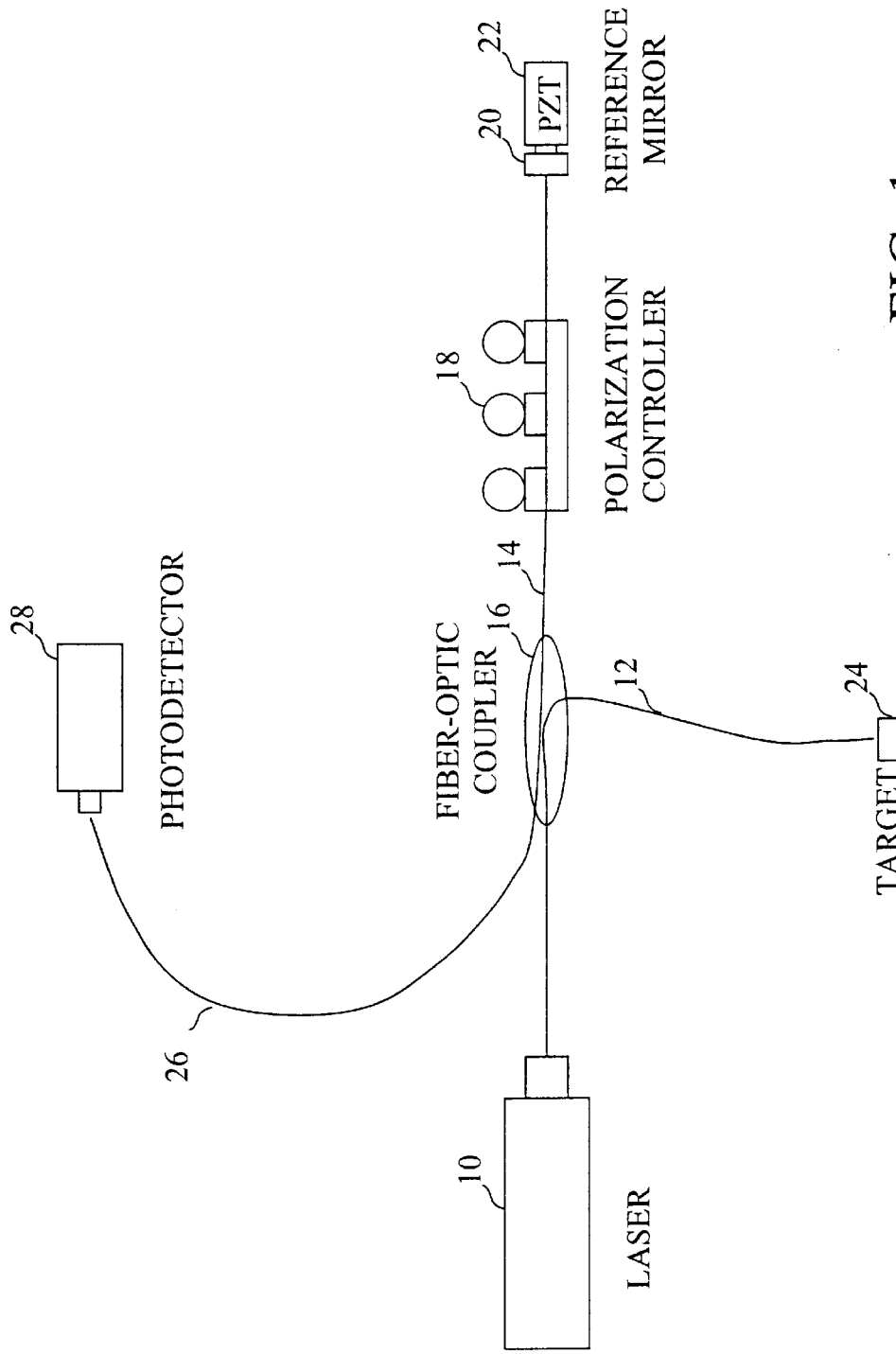
FIG. 1 is a high-level block diagram of a prior art fiber-optic interferometer in the Michelson configuration.
Figure 2:
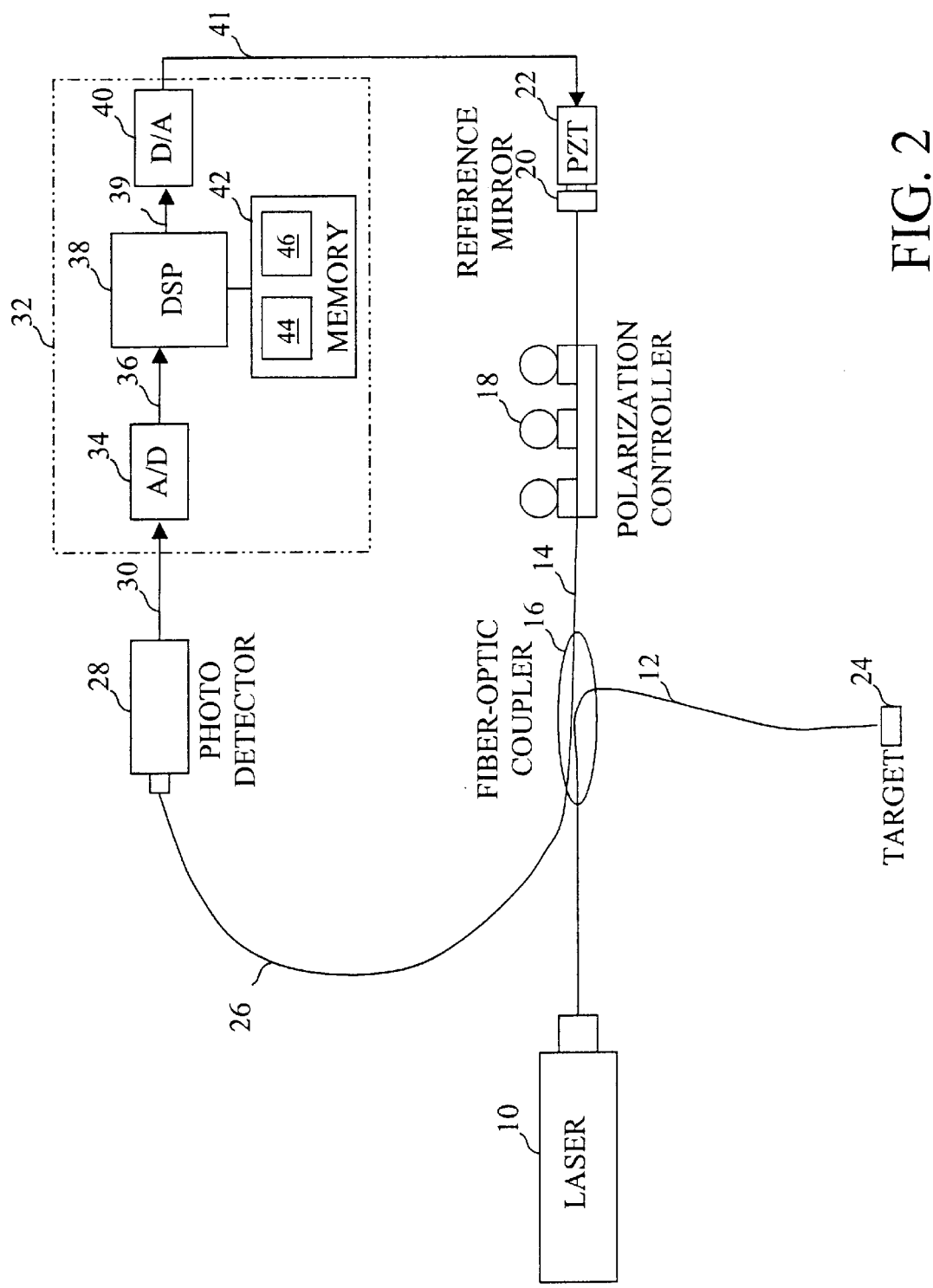
FIG. 2 is a high-level block diagram of a fiber-optic interferometer system in the Michelson configuration in accordance with the present invention.

With reference again to the figures and in particular with reference to FIG. 2, there is illustrated a high-level block diagram of a Michelson configuration interferometer system that can be stabilized at quadrature in accordance with the present invention. In FIG. 2, like reference numerals are utilized to designate like and corresponding parts to the conventional interferometer illustrated in FIG. 1. The interferometer system shown in FIG. 1 is preferably a fractional fringe interferometer, meaning that the wavelength of the laser light produced by laser 10 is greater than the displacement of target 24.

As can be seen by comparison of FIGS. 1 and 2, the interferometer system depicted in FIG. 2 is like that illustrated in FIG. 1, the only difference being the addition of a DSP-based interferometer control system 32. Interferometer control system 32 includes an analog-to-digital (A/D) converter 34, digital-to-analog (D/A) converter 40, and a memory 42, all coupled to a digital signal processor (DSP) 38. A/D converter 34 receives from photodetector 30 an analog input signal 30 (e.g., a current signal) indicative of the optical power incident upon photodetector 28. A/D converter 34 converts analog input signal 30 into a digital signal 36, which forms an input of DSP 38. Through execution of stabilization code 44 residing in memory 42, DSP 38 processes digital signal 36 to produce a digital stabilization signal 39 that, following conversion into an analog stabilization signal 41 by D/A converter 40, controls PZT 22 to stabilize the interferometer system at quadrature. Once the interferometer system is stabilized at quadrature, DSP 38 executes demodulation code 46 stored within memory 42 to determine the amplitude a of the displacement of target 24.

According to the present invention, DSP 38 imposes variations of known frequencies in the optical path lengths of reference and signal arms 12 and 14, for example, by utilizing PZTs 22 to vibrate target 24 and reference mirror 20 or to stretch and relax the single-mode fibers providing the optical pathways for reference and signal arms 12 and 14. In a preferred embodiment, DSP 38 imposes sinusoidal variation in the optical path length difference between signal and reference arms 12 and 14, where the frequency $\omega_r$ of the variation in the optical path length of reference arm 12 is less than the frequency $\omega_t$ of the variation in the optical path length of signal arm 14 (i.e., $\omega_r < \omega_t$). However, in other embodiments, $\omega_r$ may be greater than $\omega_t$. Quadrature is attained when the optical path length difference between the reference and signal arms is an odd multiple of $\pi/2$ radians. The variation in the optical path length of the reference arm has an amplitude equal to one-quarter of the optical wavelength of the laser light in order to produce a phase shift of $\pi/2$ radians in the reference arm beam. The sinusoidal variation in the optical path length of the reference arm also has a known phase of $\phi_r$ with respect to the stimulus causing the optical path length variation. The sinusoidal variation in the optical path length of the signal arm has unknown amplitude a and a phase relative to the stimulus $\phi_s$.

Remembering the optical power relation given in equation (1) above, the ac component of the optical power detected by photodetector 28 at quadrature can be given as $$P_{OQ} Re\{E_{ro}E_{to}^*\}\cos(\Phi_Q + 2k\delta), \quad (2)$$

where $\Phi_Q$ = optical path length difference at quadrature.

Because both target 24 and reference mirror 22 both exhibit sinusoidal vibration, $\delta$, the displacement of the target in equation (2), can be represented as $$\delta = a\sin(\omega_t t + \phi_t), \quad (3)$$

and the optical path length difference at quadrature $\Phi_Q$ can be expressed in terms of the static optical path length difference $\Phi$ as $$\Phi_Q = \Phi + \pi\sin(\omega_r t + \phi_r). \quad (4)$$

Substituting equations (3) and (4), equation (2) can be rewritten as $$P_{OQ} Re\{E_{ro}E_{to}^*\}\cos[\Phi + 2ka\sin(\omega_t t + \phi_t) + \pi\sin(\omega_r t + \phi_r)]. \quad (5)$$

Equation (5) may then be expanded using the Fourier-Bessel relationships to yield $$P_{OQ} \propto \quad (6)$$

$Re\{E_{ro}E_{to}^*\}\{\cos(\Phi)J_0(\pi)J_0(2ka) + 2\sin(\Phi)J_0(\pi)J_1(2ka)\sin(\omega_1 t + \phi_t) -$
$2\sin(\Phi)J_1(\pi)J_0(2ka)\sin(\omega_r t + \phi_r) +$
$2\cos(\Phi)J_0(\pi)J_2(2ka)\cos(2\omega_t t + 2\phi_t) + 2\cos(\Phi)J_2(\pi)J_0(2ka)$
$\cos(2\omega_r t + 2\phi_r) - 2\sin(\Phi)J_0(\pi)J_3(2ka)\sin(3\omega_t t + 3\phi_t) -$
$2\sin(\Phi)J_3(\pi)J_0(2ka)\sin(3\omega_r t + 3\phi_r) + \ldots \}$ where $J_i()$ is a Bessel function of the first kind of order i.

By inspection of equation (6) it can be seen that the amplitudes of the frequency components of the optical power, and in particular the signal amplitudes oscillating at the second and third harmonics of the reference arm signal, contain information regarding the quadrature point of the interferometer. In accordance with the present invention, DSP 38 extracts these frequency component amplitudes from digital signal 36, for example, by utilizing the discrete Fourier transform (DFT) to compute $$|S_{2r}| = |C2\cos(\Phi)J_2(\pi)J_0(2ka)| \text{ and} \quad (7)$$

$$|S_{3r}| = |C2\sin(\Phi)J_3(\pi)J_0(2ka)| \quad (8)$$

where C is a gain constant of the interferometer system. In a particularly preferred embodiment of the present invention, a computationally efficient DFT technique known as the Goertzel algorithm is employed, as discussed further below. Once harmonic signal amplitudes $|S_{2r}|$ and $|S_{3r}|$ are determined, the static optical path length difference $\Phi$ needed to generated stabilization signal 40 can be determined by $$\Phi = \tan^{-1}(J_2(\pi)|S_{3r}|/J_3(\pi)|S_{2r}|), \quad (9)$$

where $J_2(\pi)/J_3(\pi)$ is a known constant approximately equal to 1.4558.

Figure 3:
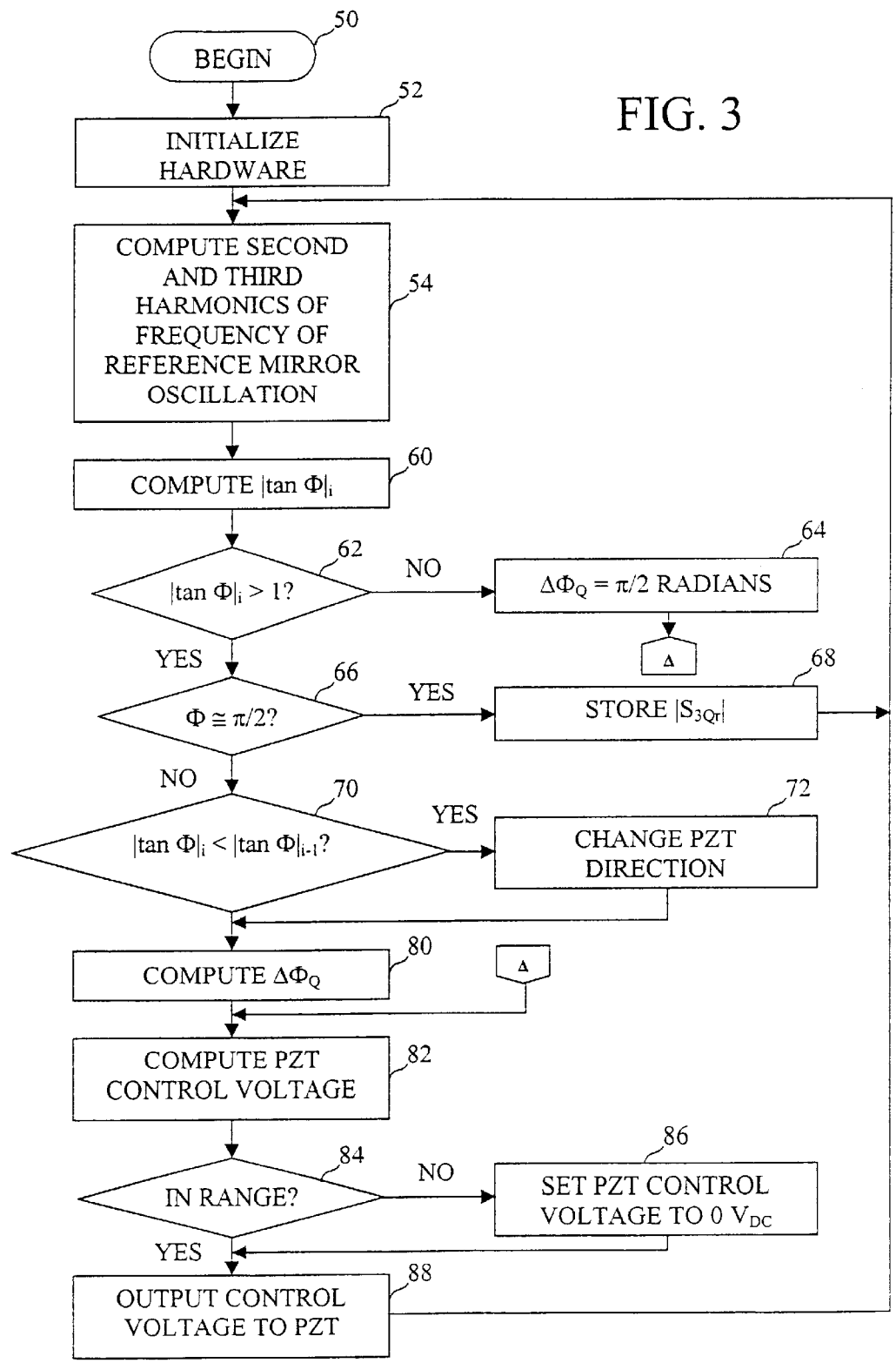
FIG. 3 is a high-level logical flowchart of a method of stabilizing an interferometer at quadrature in accordance with the present invention.

Referring now to FIG. 3, there is illustrated a high-level logical flowchart of a preferred embodiment of a method by which an interferometer control system stabilizes an interferometer at quadrature. The method shown in FIG. 3 is preferably implemented in the embodiment of FIG. 2 through the execution of stabilization code by DSP 38.

Figure 4:
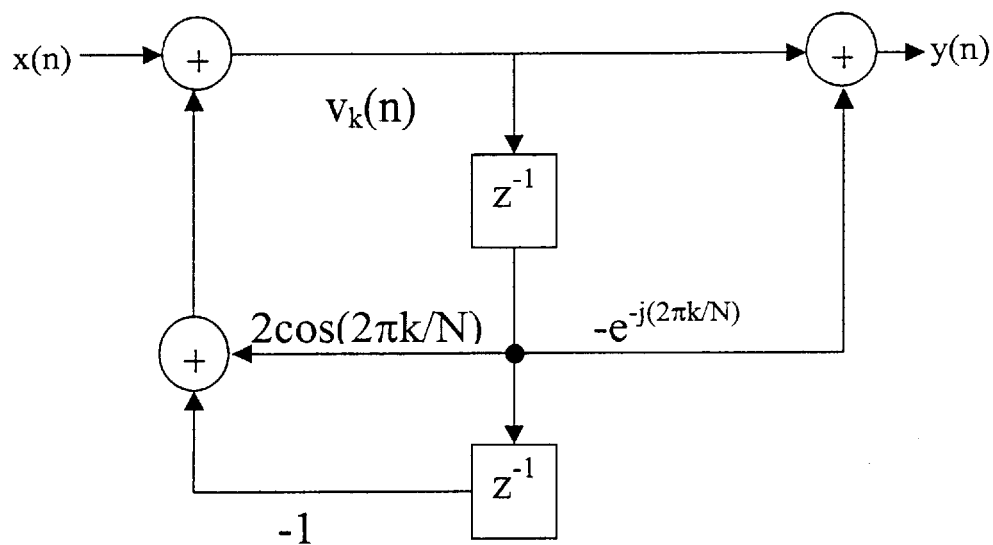
FIG. 4 is a direct form II linear filter representation of the Goertzel algorithm.

As shown, the process begins at block 50 and thereafter proceeds to block 52, which illustrates DSP 38 performing hardware initialization, for example, by clearing its register set and resetting A/D converter 34. Then, as shown at block 54, DSP 38 executes two Goertzel algorithms in parallel to compute the reference arm signal amplitudes oscillating at the second and third harmonics of digital signal 36, as described in equations (7) and (8). The difference equations associated with the Goertzel algorithm are $$v_k(n)=2\cos(2\pi k/N)v_k(n-1)-v_k(n-2)+x(n) \text{ and} \tag{10}$$

$$y_k(n)=v_k(n)-W_N v_k(n-1), \tag{11}$$

where
k=frequency bin number,
n=input sample number,
N=input signal length,
$W_N = e^{-j2\pi k/N}$,
and the initial conditions are $v_k(-1)=v_k(-2)=0$. The desired magnitude of the frequency component associated with frequency bin k is the output of the Goertzel algorithm on the $N^{th}$ iteration. A direct form II linear filter realization of the Goertzel algorithm is illustrated in FIG. 4.

Figure 5:
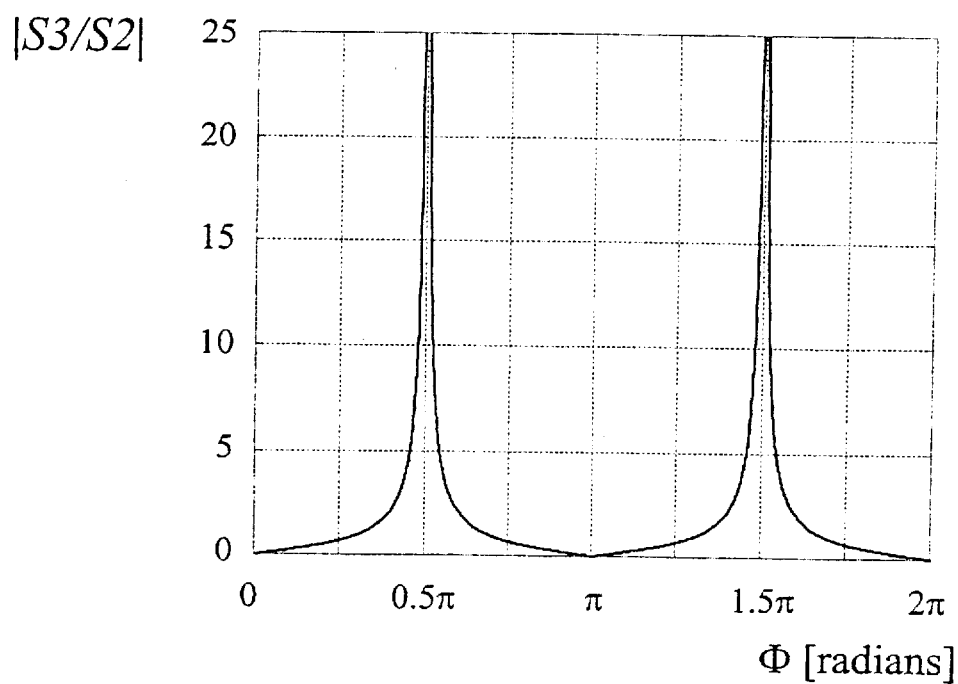
FIG. 5 is a graph of the tangent of $\Phi$ versus $\Phi$, where $\Phi$ is the optical path length difference between the reference and signal arms of the interferometer.

Once DSP 38 computes the reference signal magnitudes at the second and third harmonics within digital signal 36 utilizing the Goertzel algorithm, DSP 38 utilizes the relationship given in equation (9) to compute $|\tan\Phi|_i$, as shown at block 60 of FIG. 3. As depicted in FIG. 5, $|\tan\Phi|_i$, which is proportional to the ratio S3/S2, has a value less than 1 when $\Phi$ is near an integer multiple of $\pi$ and asymptotically approaches infinity as $\Phi$ approaches an odd multiple of $\pi/2$ (i.e., quadrature). Thus, if $|\tan\Phi|_i$ is less than 1, meaning that $\Phi$ is near an integer multiple of $\pi$, the process shown in FIG. 3 proceeds from block 60 through block 62 to block 64, which illustrates setting $\Delta\Phi_Q$, the required change in optical path length required to reach quadrature, to $\pi/2$ radians. The process then passes through page connector A to block 82, which is described below.

Returning to blocks 60 and 62, if $|\tan\Phi|_i$ is greater than 1 and has a sufficiently high magnitude (e.g., greater than 600) to approximate the quadrature condition of $\Phi \cong \pi/2$, then the magnitude of the reference signal amplitude oscillating at the third harmonic when stabilized at quadrature (herein denoted as $|S_{3Qr}|$) is stored for subsequent demodulation of the digital signal 36 to obtain the unknown target amplitude, as illustrated at block 68. (Signal demodulation is discussed in detail below with reference to FIG. 6.) Following block 68 the process returns to block 54 for the computation of $|\tan\Phi|$ for a subsequent sample i.

If determinations are made at blocks 62 and 66 that $|\tan\Phi|_i$ is not less than 1 and $\Phi$ does not approximate an odd multiple of $\pi/2$, then a further determination is made at block 70 whether $|\tan\Phi|$ for the current sample i is less than $|\tan\Phi|$ for the previous sample i−1, that is, whether the interferometer is moving toward or away from quadrature. If the interferometer is approaching quadrature, then the process passes to block 80, which is described below. If, however, the interferometer is moving away from quadrature, as evidenced by $|\tan\Phi|_i$ being less than $|\tan\Phi|_{i-1}$, the process proceeds to block 72, which illustrates DSP 38 storing an indication to reverse the direction in which PZT 22 is moving reference mirror 20. The process then proceeds to block 80.

Block 80 depicts DSP 38 computing $\Delta\Phi_Q$, the required change in optical path length required to reach quadrature. $\Delta\Phi_Q$ can be calculated, for example, by first applying an arctangent approximation to equation (9) to obtain $$\Phi_Q = \pi/2 - |\tan\Phi|/(|\tan\Phi|^2 + 0.28) \tag{12}$$

Because quadrature exists at odd multiples of $\pi/2$, $\Delta\Phi_Q$ can thus be expressed as $$\Delta\Phi_Q \approx |\tan\Phi|/(|\tan\Phi|^2 + 0.28) \tag{13}$$

DSP 38 then computes a DC control voltage (i.e., an error signal) for PZT 22, as shown at block 82, for example, by multiplying $\Delta\Phi_Q$ by a conversion factor. If DSP 38 determines at block 84 that the computed DC control voltage is outside of the range of DSP 38 (e.g., because of environmentally induced drift), then DSP 38 resets the DC control voltage to an initial value (e.g., 0 VDC) as shown at block 86. Following either block 84 or block 86, DSP 38 outputs the DC control voltage to PZT 22, as illustrated at block 88. In accordance with a preferred embodiment of the present invention, the DC control voltage forms the DC component of a composite stabilization signal 40, whose AC component excites PZT 22 to sinusoidally vibrate reference mirror 20. Thus, the sign and magnitude of the DC component of stabilization signal 40 form an error signal that controls the direction and distance that PZT 22 moves reference mirror 20, and the AC component controls $\omega_r$, the frequency of oscillation of reference mirror 20. Following block 88, the process returns to block 54, which was described above.

Figure 6:
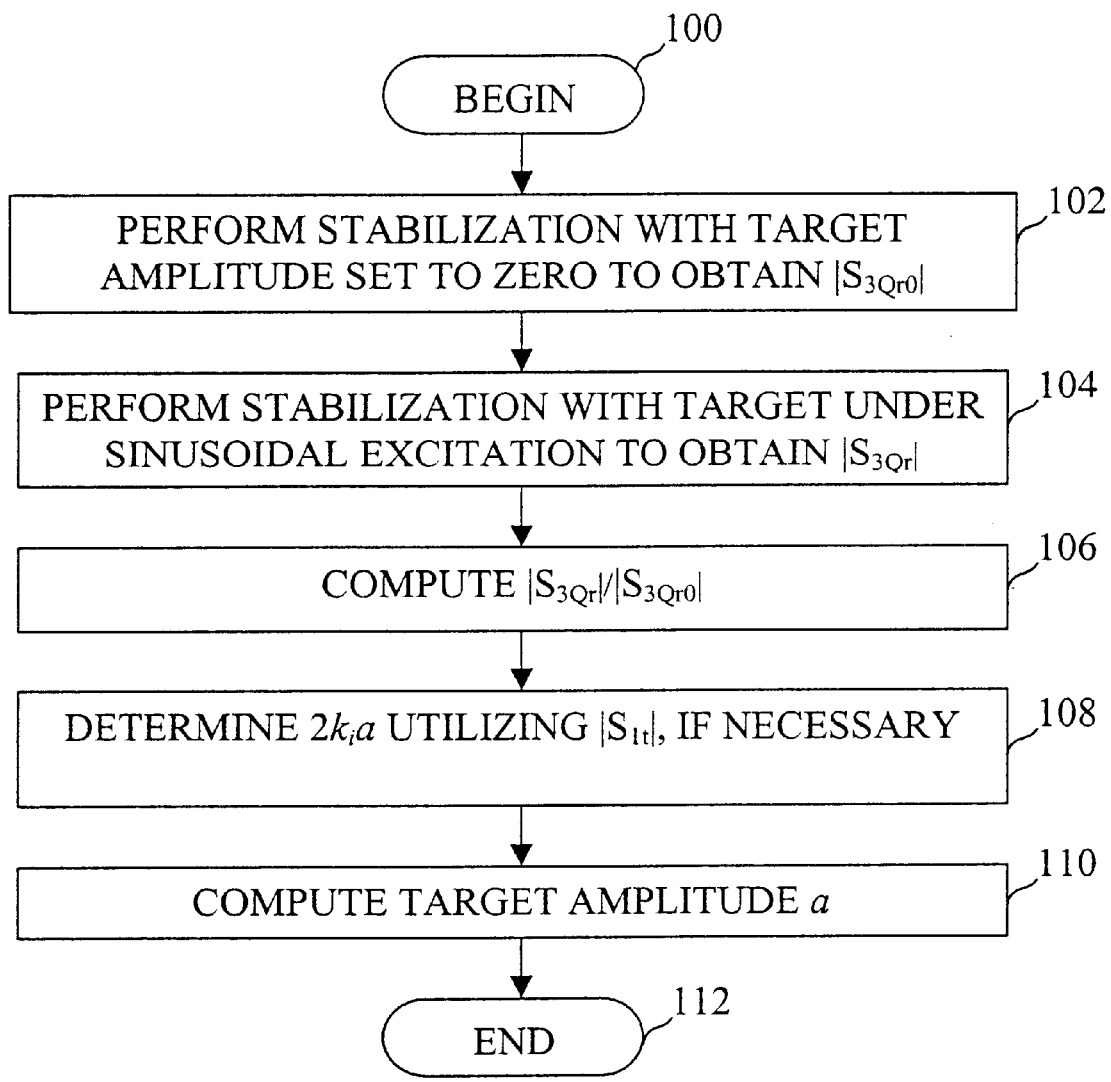
FIG. 6 is a high-level logical flowchart of a method of demodulating a signal indicative of optical power to determine an unknown target amplitude in accordance with the present invention.

With reference now to FIG. 6, there is illustrated a high-level logical flowchart of a preferred method by which an interferometer control system demodulates a signal indicative of optical power to determine the unknown amplitude a of an interferometer target. As above, the method shown in FIG. 6 is preferably implemented in the embodiment of FIG. 2 through the execution of demodulation code by DSP 38.

The process shown in FIG. 6 begins at block 100 and then proceeds to block 102, which illustrates DSP 38 performing the stabilization procedure illustrated in FIG. 3 while the amplitude of the target oscillation is set to zero. As illustrated at block 68 of FIG. 3, with the interferometer stabilized at quadrature, $|S_{3Qr0}|$, the magnitude of the reference arm signal oscillating at the third harmonic, is obtained. At quadrature and with no vibrational displacement of the target, equation (8) can be simplified as $$|S_{3Qr0}| = |C2J_3(\pi)|, \tag{14}$$

which provides a calibration factor that characterizes the interferometer system. Next, as depicted at block 104, DSP 38 repeats the stabilization process shown in FIG. 3 with the target under sinusoidal excitation of known frequency $\omega_t$ to obtain the quantity $|S_{3Qr}|$. As shown at block 106, DSP 38 then computes the ratio $|S_{3Qr}|/|S_{3Qr0}|$, which upon reference to equations (8) and (13) can be equated with $J_0(2ka)$, a zero order Bessel function having the quantity 2ka as an argument.

Figure 7:
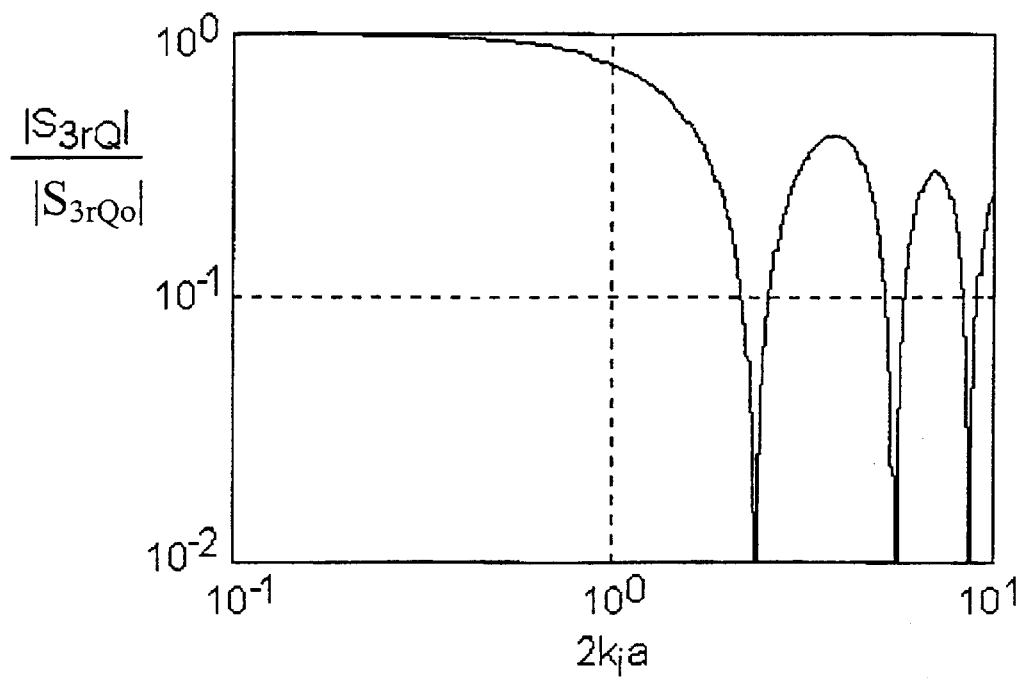
FIG. 7 is a graph of a zero order Bessel function having 2ka as an argument, where a is the amplitude of the target.

FIG. 7 plots the zero order Bessel function $J_0$ as a function of 2ka. As illustrated in FIG. 7, the amplitude a to be determined can be ascertained unambiguously for certain values of $|S_{3Qr}|/|S_{3Qr0}|$. However, for small values of $|S_{3Qr}|/|S_{3Qr0}|$, multiple target amplitudes a are possible. Thus, some additional information is required to unambiguously determined a for some values of $|S_{3Qr}|/|S_{3Qr0}|$.

In accordance with the present invention, ambiguity in the value of a, if any, is removed by obtaining an additional frequency component present in digital signal 36. In a particularly preferred embodiment of the present invention, the Goertzel algorithm is utilized to detect $|S_{1,f}|$, the signal arm amplitude present at the fundamental frequency of target 24, which is given generally as $$|S_{1,f}|=|C2 \sin \Phi J_0(\pi) J_1(2ak)| \quad (15)$$

and reduces at quadrature to $$|S_{1,f}|=|C2 J_0(\pi) J_1(2ak)|. \quad (16)$$

As illustrated at blocks 108 and 110 of FIG. 6, with this additional piece of information, a lookup table relating $J_1(2ka)$ and $J_0(2ka)$ can be utilized to determine 2ka and, because k is a known propagation constant, to thus determine the target amplitude a. The process illustrated in FIG. 6 thereafter terminates at block 112.

Figure 8:
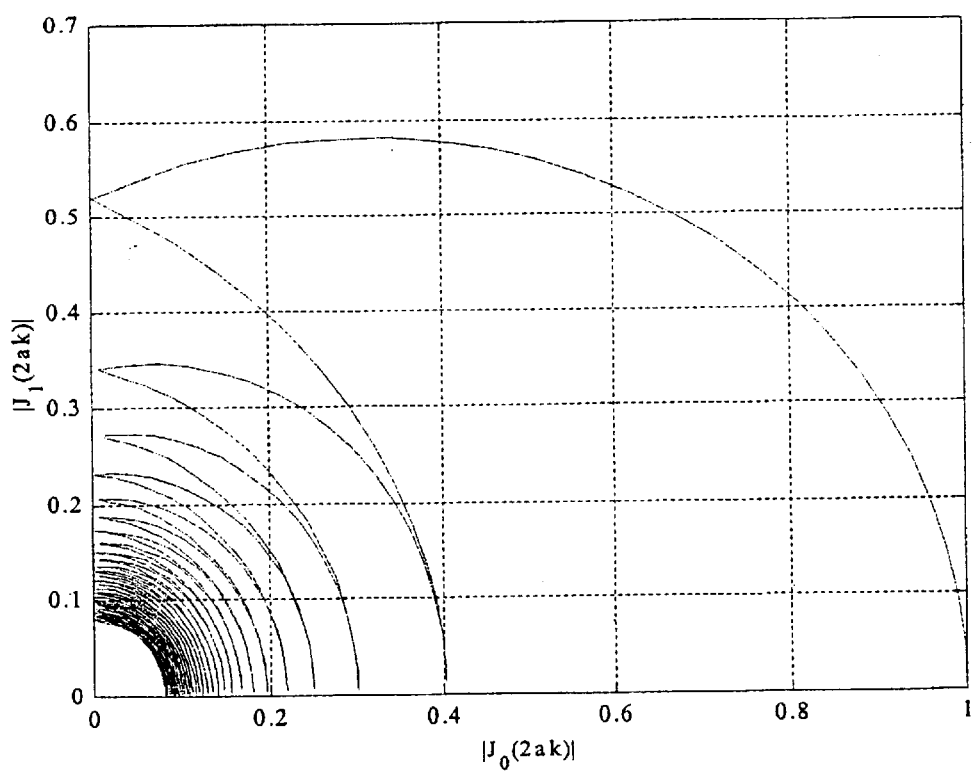
FIG. 8 is a graph plotting the first order Bessel function $|J_1(2ka)|$ against the zero order Bessel function $|J_0(2ka)|$ to illustrate how ambiguity in the target amplitude a can be resolved.

Referring now to FIG. 8, a graph plotting $|J_1(2ka)|$ against $|J_0(2ka)|$ is given to illustrate how ambiguity in the target amplitude a can be resolved by reference to a lookup table. As depicted, once $|J_1(2ka)|$, which is plotted along the y axis, is known, the value of 2ka that causes $|J_0(2ka)|$ to intersect the solution curve can be determined. The value of a can then be readily computed.

As has been described, the present invention provides a method and system for stabilizing an interferometer at quadrature, the interferometer's operating point of maximum sensitivity. In accordance with a preferred embodiment of the present invention, an interferometer under sinusoidal modulation is stabilized at quadrature by an error signal that adjusts the optical path length difference between signal and reference arms of the interferometer. The error signal is computed based upon determinations, utilizing the Goertzel algorithm, of the optical power amplitudes appearing at multiple harmonics of the reference frequency. If the computed error signal is beyond the available range, the error signal is reset to an initial value. The error signal is preferably communicated to a transducer as the DC component of a composite stabilization signal, whose AC component excites sinusoidal oscillation of the reference path length.

Once the interferometer is stabilized, the amplitude of the target can be determined unambiguously by demodulating a signal indicative of the optical power of the interfering reference and signal arms beams. Advantageously, demodulation can be performed based upon the relative amplitudes of a particular signal harmonic with and without target excitation. Ambiguity in the target amplitude, if any, can be eliminated utilizing the signal amplitude of a selected harmonic of the target.

While the invention has been particularly shown and described with reference to a preferred embodiment, it will be understood by those skilled in the art that various changes in form and detail may be made therein without departing from the spirit and scope of the invention. For example, although the present invention has been described with reference to an exemplary interferometer system in the Michelson configuration, it should be understood that the present invention is also applicable to other interferometer configurations, such as Fabry-Perot, Mach Zehnder, Fizeau, Sagnac, etc.

Furthermore, although aspects of the present invention have been described with respect to a data processing system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of stabilizing an interferometer at quadrature, said method comprising:
   digitizing an input to obtain a digital signal indicative of optical power;
   from the digital signal, determining an optical path length correction required to stabilize the interferometer at quadrature utilizing signal amplitudes appearing at multiple harmonics of the digital signal; and
   outputting an error signal indicative of the optical path length correction.

2. The method of claim 1, wherein the determining step comprises computing the signal amplitudes appearing at multiple harmonics of the digital signal utilizing a Goertzel algorithm.

3. The method of claim 2, wherein the computing step comprises computing the signal amplitudes appearing at the second and third harmonics of a reference modulation signal component of the digital signal.

4. The method of claim 3, and further comprising:
   if the interferometer is at quadrature, storing the magnitude of the signal amplitude appearing at the third harmonic of the digital signal.

5. The method of claim 1, and further comprising:
   computing a magnitude of the error signal; and
   if the magnitude of the error signal magnitude is out of range, resetting the magnitude of the error signal to an initial value.

6. The method of claim 1, said generating step comprising generating a stabilization signal having said error signal as a DC component and a reference modulation signal as the AC component.

7. The method of claim 1, and further comprising:
   at quadrature, demodulating the digital signal to determine a displacement amplitude of a target of the interferometer.

8. The method of claim 7, said demodulating step further comprising:
   determining first and second signal amplitudes of a particular harmonic in the digital signal with and without target oscillation; and
   determining a displacement amplitude of the target based upon the relative magnitudes of the first and second signal amplitudes of the particular harmonic.

9. The method of claim 8, and further comprising eliminating ambiguity in the displacement amplitude by determining a signal amplitude at a harmonic of a target oscillation frequency.

10. An interferometer control system, comprising:
    means for digitizing an input to obtain a digital signal indicative of optical power;
    means for determining an optical path length correction required to stabilize the interferometer at quadrature utilizing signal amplitudes appearing at multiple harmonics of the digital signal; and
    means for outputting an error signal indicative of the optical path length correction.

11. The interferometer control system of claim 10, wherein the means for determining comprises means for computing the signal amplitudes appearing at multiple harmonics of the digital signal utilizing a Goertzel algorithm.

12. The interferometer control system of claim 11, wherein the means for computing comprises means for computing the signal amplitudes appearing at the second and third harmonics of a reference modulation signal component of the digital signal.

13. The interferometer control system of claim 12, and further comprising:

means for, if the interferometer is at quadrature, storing the magnitude of the signal amplitude appearing at the third harmonic of the digital signal.

14. The interferometer control system of claim 10, and further comprising:

means for computing a magnitude of the error signal; and means for resetting the magnitude of the error signal to an initial value if the magnitude of the error signal magnitude is out of range.

15. The interferometer control system of claim 10, said means for generating comprising means for generating a stabilization signal having said error signal as a DC component and a reference modulation signal as the AC component.

16. The interferometer control system of claim 10, and further comprising:

means for demodulating the digital signal when the interferometer is at quadrature to determine a displacement amplitude of a target of the interferometer.

17. The interferometer control system of claim 16, said means for demodulating further comprising:

means for determining first and second signal amplitudes of a particular harmonic in the digital signal with and without target oscillation; and means for determining a displacement amplitude of the target based upon the relative magnitudes of the first and second signal amplitudes of the particular harmonic.

18. The interferometer control system of claim 17, and further comprising means for eliminating ambiguity in the displacement amplitude by determining a signal amplitude, at a harmonic of a target oscillation frequency.

19. An interferometer system, comprising:

an interferometer; and an interferometer control system in accordance with claim 10, wherein said interferometer control system is coupled to said interferometer.

20. An interferometer control system, comprising:

a digital processor;

memory, coupled to the processor, that stores stabilization code executable by the processor, wherein the stabilization code causes the processor to determines an optical path length correction required to stabilize an interferometer at quadrature utilizing signal amplitudes appearing at multiple harmonics of a digital signal indicative of an optical power of the interferometer, and output an error signal indicative of the optical path length correction.

21. The interferometer control system of claim 20, wherein the stabilization code causes the processor to compute the signal amplitudes appearing at multiple harmonics of the digital signal utilizing a Goertzel algorithm.

22. The interferometer control system of claim 21, wherein the stabilization code causes the processor to compute the signal amplitudes appearing at the second and third harmonics of a reference modulation signal component of the digital signal.

23. The interferometer control system of claim 22, wherein the stabilization code causes the processor to store the magnitude of the third harmonic of the signal if the interferometer is at quadrature.

24. The interferometer control system of claim 20, wherein the stabilization code causes the processor to compute a magnitude of the error signal and reset the magnitude of the error signal to an initial value if the magnitude as out of range.

25. The interferometer control system of claim 20, wherein the stabilization code causes the processor to output a stabilization signal having said error signal as a DC component and a reference modulation signal as the AC component.

26. The interferometer control system of claim 20, wherein the memory further comprises demodulation code executable by the processor, wherein the demodulation code causes the processor to demodulate the digital signal when the interferometer is at quadrature to determine a displacement amplitude of a target of the interferometer.

27. The interferometer control system of claim 26, wherein said demodulation code causes the processor to determine first and second signal amplitudes of a particular harmonic in the digital signal with and without target oscillation and, based upon the relative magnitudes of the first and second signal amplitudes of the particular harmonic, determine a displacement amplitude of the target.

28. The interferometer control system of claim 27, wherein said demodulation code eliminates ambiguity in the displacement amplitude by determining a signal amplitude at a harmonic of a target oscillation frequency.

29. The interferometer control system of claim 20, and further comprising an analog-to-digital converter coupled to a signal input of said processor.

30. An interferometer system, comprising:

an interferometer; and an interferometer control system in accordance with claim 20, wherein said interferometer control system is coupled to said interferometer.

* * * * *